US008828595B2

(12) United States Patent
Maeda et al.

(10) Patent No.: US 8,828,595 B2

(45) Date of Patent: Sep. 9, 2014

(54) SEALING MATERIAL COMPOSITION FOR SECONDARY BATTERY, METHOD FOR PRODUCING SAME, AND SECONDARY BATTERY USING SAME

(75) Inventors: Koichiro Maeda, Yokohama (JP); Naoki Yoshida, Tokyo (JP)

(73) Assignee: Zeon Corporation, Tokyo (JP)

( * ) Notice: Subject to any disclaimer, the term of this patent is extended or adjusted under 35 U.S.C. 154(b) by 73 days.

(21) Appl. No.: 13/698,349

(22) PCT Filed: May 17, 2011

(86) PCT No.: PCT/JP2011/061271

§ 371 (c)(1), (2), (4) Date: Jan. 30, 2013

(87) PCT Pub. No.: WO2011/145595

PCT Pub. Date: Nov. 24, 2011

(65) Prior Publication Data

US 2013/0122358 A1 May 16, 2013

(30) Foreign Application Priority Data

May 17, 2010 (JP) ................................ 2010-113509

(51) Int. Cl.

| | |
|---|---|
| ***H01M 2/08*** | (2006.01) |
| ***C08G 18/69*** | (2006.01) |
| ***C08F 136/06*** | (2006.01) |
| ***C08L 9/00*** | (2006.01) |
| ***H01M 2/04*** | (2006.01) |
| *H01M 10/052* | (2010.01) |

(52) U.S. Cl.

CPC .. *C08L 9/00* (2013.01); *Y02E 60/12* (2013.01); *C08G 18/69* (2013.01); *C08F 136/06* (2013.01); *H01M 2/08* (2013.01); *H01M 10/052* (2013.01); *H01M 2/0413* (2013.01)

USPC ............ 429/174; 429/78; 429/133; 429/139; 429/171; 429/173; 429/181; 429/184

(58) Field of Classification Search

CPC ......... C08F 136/06; C08G 18/69; C08L 9/00; H01M 10/052; H01M 2/0413; H01M 2/08; Y02E 60/12

USPC ........... 429/78, 133, 139, 171, 173, 174, 181, 429/184

See application file for complete search history.

(56) References Cited

U.S. PATENT DOCUMENTS

| | | | |
|---|---|---|---|
| 4,740,435 | A | 4/1988 | Markin et al. |
| 5,332,633 | A | 7/1994 | Adamson et al. |

(Continued)

FOREIGN PATENT DOCUMENTS

| | | | |
|---|---|---|---|
| JP | 64-71057 | A | 3/1989 |
| JP | 5-129008 | A | 5/1993 |

(Continued)

OTHER PUBLICATIONS

Forms PCT/ISA/237, PCT/IB/373 and PCT/IB/338, issued in PCT/JP2011/061271 dated Dec. 20, 2012.

(Continued)

*Primary Examiner* — Patrick Ryan

*Assistant Examiner* — Ben Lewis

(74) *Attorney, Agent, or Firm* — Birch, Stewart, Kolasch & Birch, LLP

(57) ABSTRACT

Disclosed is a sealing material composition for a secondary battery, which is capable of providing a safe sealing layer that exhibits excellent adhesion in the sealing portion, while preventing leakage of the electrolyte solution. Specifically disclosed is a sealing material composition for a secondary battery, which is characterized by containing a diene rubber, a thermoplastic elastomer, carbon and an organic liquid material. The sealing material composition for a secondary battery is also characterized in that the number of coarse particles contained in 3 mL of the composition is 10 or less, said coarse particles having a maximum diameter of 10 μm or more.

20 Claims, 1 Drawing Sheet

(56) References Cited

U.S. PATENT DOCUMENTS

| | | | | |
|---|---|---|---|---|
| 6,306,537 | B2 | 10/2001 | Schubert | |
| 2002/0068783 | A1 * | 6/2002 | Maeda et al. | 524/474 |
| 2003/0118902 | A1 | 6/2003 | Schubert et al. | |

FOREIGN PATENT DOCUMENTS

| | | | |
|---|---|---|---|
| JP | 11-40118 | A | 2/1999 |
| JP | 2000-243359 | A | 9/2000 |
| JP | 2011-14371 | A | 1/2011 |

OTHER PUBLICATIONS

International Search Report mailed on Aug. 9, 2011, issued in PCT/JP2011/061271.

European Searcth Report dated Apr. 7, 2014, issued in European Patent Application No. 11 783529.8.

* cited by examiner

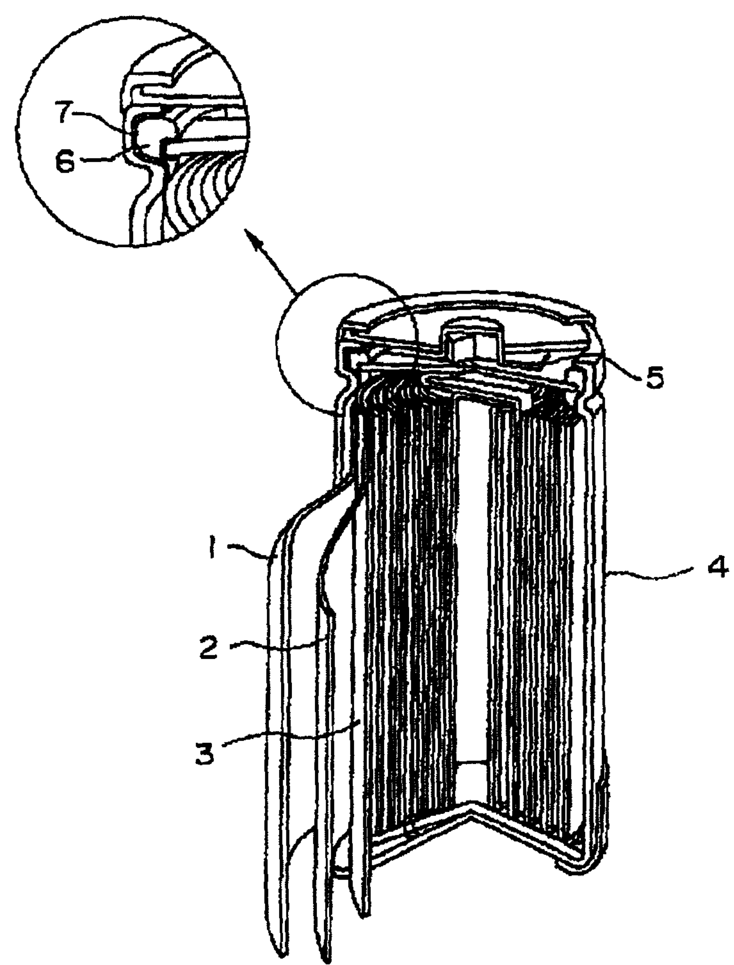
7
6
5
1
2
3
4

SEALING MATERIAL COMPOSITION FOR SECONDARY BATTERY, METHOD FOR PRODUCING SAME, AND SECONDARY BATTERY USING SAME

TECHNICAL FIELD

The present invention relates to a sealing material composition for secondary battery having particularly excellent sealing property at high temperature used for the nickel-hydrogen battery or the nickel cadmium battery (hereinafter these may be referred as "alkaline battery") and the lithium secondary battery or so, and also the present invention relates to the production method thereof and the secondary battery using these.

BACKGROUND ART

Conventionally, the alkaline secondary battery has the electric power generation element by spirally rolling-up the positive electrode formed by pasting and drying the paste having nickel oxide as the main component to the substrate, and the negative electrode formed by pasting and drying the paste having cadmium and hydrogen absorbing alloy powder as the main component by providing the separator of non-woven fabric such as polyethylene, polypropylene or so therebetween.

Also, the lithium secondary battery has the electric power generating element by spirally rolling-up the positive electrode and the negative electrode comprising the active material layer capable of absorbing and releasing the lithium ion reversibly, and providing the separator therebetween.

This electric power generating element is pressure inserted into the metal container of cylinder shape or a square shape having a widely opened opening part, and the electrolytic solution having high concentration and high viscosity is introduced, and it is sealed by the sealing cap of sealing cover or so via the insulation gasket followed by reducing the diameter of the opening part of the metal container and bending the opening end inward; thereby the battery is sealed. Between the insulation gasket and the inner face of the opening part of the metal container, the sealing layer is formed by pasting the sealing material composition for further secure seal.

However, at the surface of the inside of the opening part of the metal container which is usually used, there are minute roughness in the longitudinal direction formed during the squeeze processing, thus the sealing material composition having adhesiveness may not be able to sufficiently embedded to the bottom of the roughness; therefore the electrolytic solution introduced in the battery may leak out from the battery due to the electrocapillarity. Therefore, not only that it deteriorate the electric performance, but also the used machine will also be damaged by the alkaline electrolytic solution as well. Also, in the lithium secondary battery, the organic solvent is used as the solvent of the electrolytic solution, thus if the water enters inside the battery, it is known that the cycle characteristic will be significantly deteriorated.

The alkaline secondary battery and the lithium secondary battery are widely used for the automobile recently, and along with the expansion of the used range thereof, the higher safety than the conventionally used one is demanded even under an extremely harsh condition. For example, in case the temperature of the secondary battery becomes extremely high, or in case the pressure inside the battery becomes high, it is demanded to have no damage to the machine caused by the leakage of the electrolytic solution. Various methods are being examined in order to obtain such characteristic, however the conventional seal material composition is still not sufficient enough, and higher level is being demanded in regards with the safety of the seal material itself at high temperature, the satability of the electrolytic solution or the metal container material, and the leakage prevention property of the electrolytic solutions.

In order to satisfy such demand, the use of the special seal material, the improvement of the crimp type, the strengthening of the sealing pressure, and the improvement of the insulation gasket or so are being examined. For example, as for the sealing material, pitch, tar, asphalt; the mixture of poly sulfonated ethylene with tar or asphalt; mercaptan expressed by RSH (R is alkyl group); poly vinyleden fluoride; the composition made of asphalt added with grease including the metal soap having one or more of metal selected from the group consisting of calcium, lithium, and barium; the mixture of curing agent and the urethane liquid rubber having the polybutadiene as the base; and those of half-dried polyamide resin or so dissolved or dispersed in the solvent, thereby the electrolytic solution is being prevented from leaking.

Further, for example, Patent article 1 describes that the alkaline secondary battery having excellent safety which does not allow the leakage of the electrolytic solution or the water intrusion can be obtained by sealing the seal part with the sealing material comprising the rubber of one or two or more selected from diene rubber and the rubber having the saturated main chain of polymethylene.

Patent article 2 describes the thermoplastic elastomer constituted from the block copolymer characterized by comprising two or more of glass transition temperatures; however the sealing material composition of Patent article 2 has a insufficient sealing property at the high temperature range.

Patent article 3 describes the method for sealing by elastomer made by mixing the predetermined appropriate amount of the curing agent with urethane liquid rubber having polybutadiene as the base; however in the sealing material of the patent article 3, the sealing property at the low temperature range is insufficient, hence further improvement is needed.

Patent article 4 describes that the secondary battery having significantly high safety with improved sealing property can be obtained by using the sealing material for the battery comprising the rubber having the saturated main chain of polymethylene type as the main component.

Patent article 5 describes that the secondary battery which can be used in wide range of environment with improved sealing property at high temperature can be obtained by using the sealing material for the battery comprising diene rubber having the weight average molecular weight of 10000 to 1500000 as the main component.

PRIOR ART DOCUMENT

Patent Article 1: JP Patent Laid Open No. H11-40118

Patent Article 2: JP Patent Laid Open No. H08-507898 (US counterpart publication: U.S. Pat. No. 5,332,633)

Patent Article 3: JP Patent Laid Open No. S64-071057

Patent Article 4: JP Patent Laid Open No. H10-321200

Patent Article 5: JP Patent Laid Open No. H10-55789

SUMMARY OF THE INVENTION

Technical Problems to be Solved by the Invention

The present invention was achieved in view of such situation, and the object of the present invention is to provide the sealing material composition for the battery capable of forming a safe sealing layer having excellent sealability of the seal part, and without the leakage of the electrolytic solution.

Means for Solving the Technical Problems

As a result of the keen examination in regards with the sealing material composition having excellent sealability and excellent leakage prevention property of the electrolytic solution, the present inventors have found that the above object can be achieved by reducing the number of the coarse particles in the sealing material composition, the space between the seal part can be reduced, and by sealing the leaking passage of the electrolytic solution, the above object can be attained; thereby based on such finding the present invention was achieved.

The present invention which solves the above problems include the followings as the subject.

(1) A sealing material composition for a secondary battery comprising a diene rubber, a thermoplastic elastomer, a carbon and an organic liquid, wherein a number of coarse particle having maximum diameter of 10 μm or larger included in 3 mL of said composition is 10 or less.

(2) The sealing material composition for the secondary battery as set forth in (1) wherein said diene rubber is butadiene rubber.

(3) The sealing material composition for the secondary battery as set forth in (2) wherein said butadiene rubber is butadiene rubber having 1,4-cis content of 90% or more.

(4) The sealing material composition for the secondary battery as set forth in any one of (1) to (3), wherein a weight ratio between said diene rubber and said thermoplastic elastomer (diene rubber/thermoplastic elastomer) is 60/40 to 99/1.

(5) The sealing material composition for the secondary battery as set forth in any one of (1) to (4), wherein said organic liquid is the organic liquid having a boiling point of 50 to 170° C. and a SP value of 14.0 to 20.0 $MPa^{1/2}$ at a normal pressure.

(6) The sealing material composition for the secondary battery as set forth in any one of (1) to (5) further comprising imidazole compound.

(7) A method of producing a sealing material composition for a secondary battery as set forth in (1) including steps of;

obtaining a master batch by kneading a carbon, and a diene rubber and/or a thermoplastic elastomer, and dissolving or dispersing said master batch to an organic liquid solution including the diene rubber and/or the thermoplastic elastomer, together with a remaining amount of the diene rubber and/or the thermoplastic elastomer depending on the needs.

(8) The method of producing the sealing material for the secondary battery as set forth in (7) wherein a temperature during the kneading in said step of obtaining said master batch is 100° C. to 200° C.

(9) The method of producing the sealing material for the secondary battery as set forth in (7) wherein a consuming energy during the kneading in said step of obtaining said master batch is 500 to 30,000 $MJ/m^3$.

(10) A secondary battery comprising a sealing layer comprising the sealing material composition for the secondary battery as set forth in any one of (1) to (6) at a space between an insulation gasket mounted at the sealing cap covering an opening part of a metal container housing a electricity generating element and said metal container, and/or at a space between said insulation gasket and said sealing cap.

Effects of The Invention

The sealing material composition of the present invention has number of coarse particles less than that of the conventional sealing material composition, thus the present invention has excellent sealing property, therefore by using such sealing material composition, a battery having high safety can be obtained.

BRIEF EXPLANATION OF THE FIGURES

FIG. 1 is a schematic structural view of the second battery.

MODES FOR CARRYING OUT THE INVENTION

The sealing material composition for the secondary battery of the present invention comprises a diene rubber, a thermoplastic elastomer, a carbon and an organic liquid, and a number of a coarse particle having maximum diameter is 10 μm or larger included in 3 mL of said composition is 10 or less.

First, the diene rubber, the thermoplastic elastomer, the carbon and the organic liquid used in the present invention will be explained.

(Diene rubber)

The diene rubber used in the present invention is a polymer comprising 50 wt % or more of diene monomer unit, and it is a random copolymer between the homopolymer or copolymer of diene monomer or diene monomer with other monomer copolymerizable therewith. The diene monomer is not particularly limited, and as the specific example, butadiene, chloroprene or isoprene may be mentioned. The diene rubber used in the present invention is different from the thermoplastic elastomer described in the following, and it does not show the fluidity at high temperature.

As for other monomer copolymerizable with the diene monomer, ethylene, propylene, styrene, acrylonitrile or so may be mentioned. The ratio of other monomer copolymerizable with the diene monomer in the copolymer is less than 50 wt %, and preferably it is 45 wt % or less from the point of the heat resistance, and more preferably it is 40 wt % or less.

Also, the copolymer can take various structures such as a random structure, and a branched structure or so. Also, it may be a mixture of these pluralities of diene rubber.

Among these, from the point of the solubility resistance against the electrolytic solution, polybutadiene, polyisoprene are preferable, and particularly polybutadiene is preferable. By using the butadiene rubber as the diene rubber, the flexibility of the sealing material is enhanced, and the sealing material composition having high sealing property can be obtained.

(1,4-cis content)

As for polybutadiene, particularly, polybutadiene having 90% or more of 1,4-cis content is preferably used. The content of 1,4-cis content can be determined by obtaining the ratio of 1,4-bonding unit (5.4 to 5.6 ppm) and 1,2-bonding unit (5.0 to 5.1 ppm) using $^{1}H$-NMR analysis, followed by obtaining the ratio of the cis bonding (28 ppm) and the trans bonding (38 ppm) using the $^{13}C$-NMR analysis. The 1,4-cis content in the diene structure portion within polybutadiene rubber is preferably 93% or more, further preferably 95% or more. The sealing material composition having better sealing property can be obtained by having higher content of the cis body.

(The Molecular Weight)

The weight average molecular weight of the diene rubber used in the present invention is usually 10,000 to 1,500,000, more preferably 20,000 to 800,000, further preferably 50,000 to 700,000 in terms of the weight average molecular weight (Mw) of polystyrene measured by a gel permeation chromatography (GPC) using toluene as the solvent. When the weight average molecular weight exceeds 1,500,000, then the viscosity becomes too high when forming the sealing material composition by dissolving the diene rubber in the organic solvent, and the thickness of the sealing material layer when coating on to the insulation gasket becomes difficult to control. On the other hand, when the weight average molecular weight becomes less than 10,000, then the strength of the sealing material is weak and when mounting the insulation gasket, the sealing material layer will crack and the sealing effect may be deteriorated.

(The Thermoplastic Elastomer)

The thermoplastic elastomer of the present invention has the same property as the vulcanized rubber at the used temperature, however at high temperature, it exhibits the fluidity as same as the thermoplastic resin such as polypropylene or so, and it is capable to be melt molded or remolded thus it is different from the above mentioned diene rubber.

As a specific example, the block polymer of an aromatic vinyl monomer and conjugated diene monomer or the mixture of the block polymer, styrene thermoplastic elastomer such as the hydrogenates thereof or so may be mentioned.

Among these, as for the thermoplastic elastomer, the styrene thermoplastic elastomer (the copolymer of aromatic vinyl monomer and the conjugated diene monomer, and the hydrogenates thereof) is preferable as it has good carbon dispensability. The copolymer of the aromatic vinyl monomer and the conjugated diene monomer is preferably a block copolymer. The block copolymer may be a linear block copolymer or a radial block copolymer. Specifically, as for the copolymer of the aromatic vinyl monomer and the conjugated diene monomer, a diblock type block polymer such as styrene-butadiene block copolymer, styrene-isoprene block polymer or so; a triblock type block polymer such as styrene-butadiene-styrene block polymer, styrene-isoprene-styrene block polymer, styrene-butadiene-isoprene block polymer or so; multiblock type styrene containing block polymer such as styrene-butadiene-styrene-butadiene block polymer, styrene-isoprene-styrene-isoprene block polymer, styrene-butadiene-isoprene-styrene block polymer, styrene-butadiene-styrene-isoprene block polymer or so and the hydrogenates thereof or partial hydrogenates thereof may be mentioned. These polymer may be used alone or by mixing two or more thereof by suitably setting the mixing ratio depending on the purpose. Among these, those which are capable of being kneaded evenly with the diene rubber within the range of 100° C. to 200° C. and also able to dissolve in the organic liquids are preferable.

(The Ratio of the Diene Rubber/the Thermoplastic Elastomer)

In the present invention, the weight ratio between said diene rubber and the thermoplastic elastomer is preferably the diene rubber/the thermoplastic elastomer=60/40 to 99/1.

The weight ratio between the diene rubber and the thermoplastic elastomer (the diene rubber/the thermoplastic elastomer) is preferably 70/30 to 97/3, more preferably 80/20 to 95/5. By setting the weight ratio between the diene rubber and the thermoplastic elastomer within the above mentioned range; the sealing material having good sealing property at high temperature can be obtained.

(The Carbon)

The carbon in the present invention refers to the particle consisting of carbon having a primary particle diameter of 1 μm or less measured by a scanning electron microscope (SEM). As for specific examples, a carbon powder such as acetylene black, carbon black, channel black, graphite or so may be mentioned.

Among these, carbon black is preferable, particularly the carbon black having the primary particle diameter of 0.1 μm or less such as furnace black, channel black or so are preferable. In case of adding the carbon, it is necessary to thoroughly dissolve or disperse uniformly in the composition. The added amount of the carbon is usually 0.01 parts by weight to 20 parts by weight, preferably 0.01 parts by weight to 5 parts by weight, and more preferably 0.02 parts by weight to 3 parts by weight with respect to 100 parts by weight of diene rubber. By setting the added amount of the carbon within such range; the sealing layer having flexibility and less cracks can be obtained.

(The Organic Liquid)

The organic liquid in the present invention is a an organic compound which is in a liquid status under normal temperature (25° C.) and normal pressure, and for example it is hydrocarbon compound, nitrogen containing organic compound, oxygen containing organic compound, chlorine containing organic compound, sulfur containing organic compound or so.

In the present invention, said organic liquid compound is preferably the organic liquid comprising the boiling point at normal pressure of 50 to 170° C., and a SP value (solubility parameter) of 14.0 to 20.0 $MPa^{1/2}$.

The boiling point at the normal pressure of the organic liquid constituting the sealing material composition of the present invention is preferably 60 to 160° C., and more preferably 70 to 150° C. If the boiling point is too low, the volatility becomes too high and the operability may decline, on the other hand, when the boiling point is too high, the time for drying after the coating will take too long thus the productivity will deteriorate.

The organic liquid constituting the sealing material composition of the present invention is preferably those capable of dissolving the diene rubber or thermoplastic elastomer from the point of coating property or so, and as for the SP value specifically 14.0 to 20.0 $MPa^{1/2}$ is preferable, and 15.0 to 19.0 $MPa^{1/2}$ is more preferable.

The specific examples of the organic liquid are listed the following. The numbers described in the brackets after the name of the compounds are boiling point (° C.) at normal pressure, and the numerical figures after the decimal point is rounded off to the nearest number. When the boiling points have a range, the upper limit was written in provided that the lower limited was verified to be higher than 70° C. Also, the second numbers described inside the bracket is the SP value ($MPa^{1/2}$). That is, in the following, it is described "the compound name, (the boiling point (° C.), the SP value)). ($MPa^{1/2}$))". These organic liquids may be used by mixing two or more thereof.

n-haxane (69° C., 15.1), cyclohexane (81° C., 16.8), n-heptane (98° C., 15.1), n-octane (125° C., 15.6), isooctane (117° C., 14.1), benzene (80° C., 18.8), toluene (111° C., 18.2), o-xylene (144° C., 18.5), m-xylene (139° C., 18.0), p-xylene (138° C., 18.0), styrene (145° C., 19.0), ethylbenzene (136° C., 18.0), methylisoamylketone (145° C., 17.2), methylisobutylketone (145° C., 17.2), ethyl acetate (76.5 to 77.5° C., 18.6), n-butylacetate (124 to 126° C., 18.0) or so may be mentioned.

(Other Additives)

Further, in the sealing material composition of the present invention, besides the above mentioned components, other components may be included such as the dispersants, the leveling agent, the antioxidant, the ultraviolet ray absorbing agent, the adhesiveness enhancer or so. These are not particularly limited as long as it does not deteriorate the performance of the insulation gasket, and does not react with the electrolytic solution or dissolves in the electrolytic solution.

As the dispersants, an anionic compound, a cationic compound, a non-ionic compound and a polymer compound or so may be mentioned. The dispersants is selected depending on the diene rubber and the thermoplastic elastomer used. The content ratio of the dispersant of the sealing material composition is preferably 0.01 to 10 wt %. When the dispersant is within the above mentioned range, the sealing material slurry has good stability, and can be coated evenly; hence a thin sealing layer having can be formed and the liquid leakage can be prevented effectively.

As the leveling agent, a surfactant such as alkyl surfactant, silicone surfactant, fluorine surfactant and metal surfactant or so may be mentioned. By mixing said surfactant, the smoothness of the seal part can be improved. The content ratio of the leveling agent of the sealing material composition is preferably 0.01 to 10 wt %. When the leveling agent is within the above mentioned range, the productivity and the evenness when sealing is good, and a thin scaling layer can be formed, further the liquid leakage can be prevented effectively.

As for the antioxidant, a phenol stabilizer, a phosphate stabilizer and a hindered amine stabilizer or so may be mentioned. The content of the antioxidant of the sealing material composition is preferably 0.01 to 10 wt %. when the antioxidant is within the above mentioned range, the damage such as cracking, change of colors, hardening, softening or so caused by oxygen, sun light, heat, bending effect and ozone or so can be prevented, thus the lifetime can be extended significantly.

As the ultraviolet ray absorbing agent, for example benzotriazol ultraviolet ray absorbing agent, benzoate ultraviolet ray absorbing agent, benzophenon ultraviolet ray absorbing agent, acrylate ultraviolet ray absorbing agent, metal complex ultraviolet ray absorbing agent, organic compound such as salicylate ester or so, or inorganic compound such as fine particles of zinc oxide, cerium oxide, titanium oxide or so can be used. The content ratio of the ultraviolet ray absorbing agent of the sealing material composition is preferably 0.01 to 10 wt %. When the ultraviolet ray absorbing agent is within the above mentioned range, the deterioration caused by the ultraviolet ray can be prevented.

As the adhesive enhancer, it is not particularly limited, however imidazole compound is preferable. As the specific example of the imidazole compound, alkyl group containing imidazole compound, benzene containing imidazole compound, cyano group containing imidazole compound, trimellitate containing imidazole compound, triazine containing imidazole compound, isocyanuric acid containing imidazole compound, hydroxyl group containing imidazole compound or so may be mentioned.

As for the alkyl group containing imidazole compound, 2-methylimidazole, 2-undecyl imidazole, 2-heptadecyl imidazole, 1,2-dimethyl imidazole, 2-ethyl-4-methyl imidazole or so may be mentioned.

As for the benzene containing imidazole compound, 2-phenyl imidazole, 2-phenyl-4-methyl imidazole, 1-benzyl-2-methyl imidazole, 1-benzyl-2-phenyl imidazole may be mentioned.

As for the cyano group containing imidazole compound, 1-cyanoethyl-2-methyl imidazole, 1-cyanoethyl-2-undecyl imidazole, 1-cyanoethyl-2-ethyl-4-methyl imdazole, 1-cyanoethyl-2-phenyl imidazole may be mentioned.

As for the trimellitate containing imidazole compound, 1-cyanoethyl-2-undecyl imidazollium trimellitate, 1-cyanoethyl-2-phenyl imidazollium trimellitate may be mentioned.

As for the triazine containing imidazole compound, 2,4-diamino-6-[2'-methylimidazolyl-(1')]-ethyl-s-triazine isocyanuric acid added compound, 2-phenylimidazole isocyanuric acid added compound may be mentioned.

As for the hydroxyl group containing imidazole compound, 2-phenyl-4,5-dihyroxylmethyl imidazole, 2-phenyl-4-methyl-5-hydroxymethyl imidazole may be mentioned.

As for special type, 2,3-dihydro-1H-pyrrolo[1.2-a]benzimidazole, 1-dodecyl-2-methyl-3-benzylimidazollium chloride or so may be mentioned.

Among these imidazole compounds, from the point of the solubility into the organic liquid medium used for the sealing material, alkyl group containing imidazole compound, benzene containing imidazole compound are preferable, and among these, 1,2-dimethyl imidazole, 2-ethyl-4-methyl imidazole, 1-benzyl-2-methyl imidazole, 1-benzyl-2-phenyl imidazole or 1-cyanoethyl-2-undecyl imidazole which has the boiling point of 50° C. or less are further preferable. Considering the compatibility with the diene rubber or the thermoplastic elastomer, 1,2-dimethylimidazole are particularly preferable. The imidazole compound may be used alone or two or more thereof may be used.

The content ratio of the imidazole compound in the sealing material composition of the present invention is preferably 0.5 to 20 parts by weight, and more preferably 1 to 10 parts by weight with respect to 100 parts by weight of total of the diene rubber and the thermoplastic elastomer. By having the content ratio of the imidazole compound within the above mentioned range, the sealability at the space between the metal container and the insulation gasket mounted at the opening part of the metal container housing the electricity generating element, and at the space between the sealing cap and the insulation gasket are improved.

Besides the above mentioned, by mixing the nano particle such as fumed silica or fumed alumina or so, the thixotropy of the sealing material composition can be controlled, and the leveling property of the sealing layer obtained thereby can be improved. The content ratio of the nano particle of the sealing material composition is preferably 0.01 to 10 wt %. By having the nano particle within the above mentioned range, the productivity and the evenness during the sealing is good, and a thin sealing layer can be formed, further the liquid leakage can be prevented effectively.

(The Sealing Material Composition)

The solid content concentration including other additives in the sealing material composition of the present invention is 0.1 wt % to 50 wt %, preferably 0.5 wt % to 40 wt %, and more preferably 1 wt % to 30 wt % within the entire amount of the composition. By having the solid content concentration of the sealing material composition within the above mentioned range, the drying time during the formation of the sealing layer can be shorten.

The total amount of the diene rubber and the thermoplastic elastomer in the sealing material composition of the present invention is 0.1 wt % to 50 wt %, preferably 0.5 wt % to 40 wt %, and more preferably 1 wt % to 30 wt % in the entire amount of the composition. By having the total amount of the diene rubber and the thermoplastic elastomer in the sealing material composition of the present invention within the above mentioned range, the sealing material composition of the viscosity suitable for pasting can be obtained.

The coarse particle in the sealing material composition of the present invention refers to the primary particle or the secondary particle having a maximum diameter of 10 μm or larger which is observed using the particle gage for measuring 0 to 25 μm in the sealing material composition of 3 mL thoroughly stirred. Here, “thoroughly stirred” means that he sealing material composition being stirred at constant speed is stirred until the number of the coarse particle measured at regular interval has converged to the constant value without significant change. The coarse particle number included in 3 mL of sealing material composition of the present invention is 10 or less, preferably 7 or less, and more preferably 3 or less. When the number of the coarse particle in the composition is within above mentioned range, the sealing property between the metal container and the insulation gasket mounted at the sealing cap covering the opening part of the metal container can be improved, and the leaking passage of the electrolytic solution can be reduced.

(The Method of Production of the Sealing Material Composition for the Secondary Battery)

The sealing material composition for the secondary battery of the present invention can be obtained by preparing the master batch by kneading the carbon, the diene rubber and/or the thermoplastic elastomer; and separately from this, the organic liquid solution including the diene rubber and/or the thermoplastic elastomer is prepared, then said master batch is dissolved or dispersed in said organic liquid solution together with the remaining amount of the diene rubber and/or the thermoplastic elastomer.

The master batch of the carbon and the diene rubber and/or the thermoplastic elastomer is those wherein said carbon is dispersed in the diene rubber and/or the thermoplastic elastomer.

The organic liquid solution of the diene rubber and/or the thermoplastic elastomer is those wherein said organic liquid is dispersed in said diene rubber and/or said thermoplastic elastomer by using the mixer or so.

The master batch of said carbon, and said diene rubber and/or said thermoplastic elastomer is pre-kneaded then dissolved or dispersed in the organic liquid solution; thereby a strong force can be applied to said carbon included in the sealing material composition, thus said carbon can be highly dispersed, and the number of the coarse particle in the sealing material composition can be reduced.

(The Composition of the Master Batch)

The weight ratio of said carbon and said diene rubber and/or said thermoplastic elastomer in the master batch is preferably the total of the diene rubber and the thermoplastic elastomer/carbon=50/50 to 90/10. By having within said range, said carbon can be highly dispersed.

(The Method of Kneading the Master Batch)

The method of kneading for obtaining the master batch of the present invention is not particularly limited; however for example, a method of using a mixing device of a stirring method, a shaking method and a rotation method or so may be mentioned. Also, the method of using a homogenizer, a ball mill, a beads mill, a planetary mixer, a sand mill, a roll mill, a twin roll, a banbury mixer, an isotropic twin axis kneader, and a planetary kneader or so may be mentioned; and the method using the twin roll, the banbury mixer and the isotropic twin axis kneader are preferably from the point that the secondary particle can be cracked.

(The Kneading Temperature)

As the temperature during the kneading at the step of obtaining the above mentioned master batch, it is not particularly limited; however it is preferably 100° C. to 200° C., more preferably 120° C. to 190° C., and particularly preferably 140° C. to 180° C. By having the temperature during the kneading within the above mentioned range, the viscosity of the diene rubber or the thermoplastic elastomer are reduced, and it becomes a suitable viscosity for kneading the carbon. When the temperature during the kneading is too low, the viscosity of the diene rubber or the thermoplastic elastomer does not decrease hence the dispersion of the carbon becomes insufficient, and also too much torque is applied which may cause a cut at the main chain of the diene rubber or the thermoplastic elastomer. On the other hand, when the temperature during the kneading is too high, the oxidized deterioration of the diene rubber or the thermoplastic elastomer may take place.

(The Time for Kneading)

The kneading time of these during the step of obtaining the above mentioned master batch is not particularly limited; however it is 5 minutes or longer and 30 minutes or less, and more preferably it is 10 minutes or longer and 25 minutes or less. By having the time of kneading of the master batch within the above mentioned range, it is possible to sufficiently disperse the carbon. When the kneading time is too long, the carbon may re-aggregate and the number of the coarse particle may increase.

(The Consuming Energy)

The consuming energy during the kneading of the step obtaining the above mentioned master batch is preferably 500 to 30,000 MJ/$m^3$, more preferably 1,000 to 10,000 MJ/$m^3$, and particularly preferably 2,000 to 8,000 MJ/$m^3$. By having it within said range, the carbon can be dispersed sufficiently, and the deterioration due to the cut of the polymer molecule can be suppressed. Said consuming energy refers to the specific energy required for the kneading of per unit volume which is calculated by dividing the consumed electricity of the mixing device used for the kneading with the amount of the kneaded material.

Note that, when kneading the master batch, small amount of organic liquid may be used, however the shear force may decline thus it is preferable to prepare the master batch without using the organic liquid.

(The Organic Liquid Solution of the Diene Rubber and/or the Thermoplastic Elastomer)

The mixing method of the organic liquid of said diene rubber and/or said thermoplastic elastomer is not particularly limited; however for example the method of using the mixing device of the stirring method, a shaking method, and a rotation method or so may be mentioned.

The solid content concentration of the organic liquid is not particularly, however it is preferably 1 to 10 wt %, and more preferably 3 to 7 wt %.

(The Mixing of the Master Batch and the Organic Liquid Solution)

The sealing material composition of the present invention is obtained by dissolving or dispersing the above mentioned master batch to the organic solvent substance solution. The method of dissolving or dispersing is not particularly limited; and for example the method of mixing by using the mixing device of a stirring method, a shaking method, and a rotation method or so after adding the organic liquid solution to the master batch may be mentioned. Also, when mixing the master batch and the organic liquid solution, the remaining amount of the diene rubber and/or the thermoplastic elastomer may be added if needed, so that the sealing material composition for the secondary battery becomes the above mentioned predetermined concentration; and further the above mentioned carbon, additive and organic liquid may be added.

As for the secondary battery according to the present invention, it is not particularly limited however; alkaline secondary battery or lithium secondary battery or so are preferable.

(The Alkaline Secondary Battery)

The alkaline secondary battery as one suitable embodiment of the present invention, as the schematic structural view shown in FIG. 1, comprises the sealing layer consisting of the sealing material composition 7 for the secondary battery of the present invention at the space between the insulation gasket 6 mounted at the sealing cap 5 covering the opening part of the metal container 4 housing the electricity generating element and the metal container 4, and/or at the space between the insulation gasket 6 and the sealing cap 5. Note that, in FIG. 1, 1 is a negative electrode plate, 2 is a separator, and 3 is a positive electrode plate. Also, the electrolytic solution only needs to be a battery of the alkaline aqueous solution, and the material of the metal container, the electricity generating element and the insulation gasket thereof may be those generally used.

The electricity generating element of the alkaline secondary battery refers to the element having the positive electrode plate 3 coated and dried the paste having the nickel oxide as the main component, and the negative electrode plate 1 coated and dried the paste having cadmium or hydrogen absorbing alloy power as the main component, and providing the separator 2 which is a non-woven fabric made of polyethylene or polypropylene or so therebetween; then it is rolled-up in a spiral form, thereby the electrons are generated by a chemical reaction.

(The Lithium Secondary Battery)

The schematic structure of the lithium secondary battery which is a preferred other embodiment of present invention comprises, as same as the above mentioned alkaline secondary battery, the sealing layer consisting of the sealing material composition 7 for the secondary battery of the present invention at the space between the insulation gasket 6 mounted at the sealing cap 5 covering the opening part of the metal container 4 housing the electricity generating element and the metal container 4, and/or at the space between the insulation gasket 6 and the sealing cap 5, as shown in FIG. 1. Note that, in FIG. 1, 1 is a negative electrode plate, 2 is a separator, and 3 is a positive electrode plate. Also, as the supportive electrolytes included in the electrolytic solution, for example lithium compound such as $LiPF_6$, $LiBF_4$, $LiClO_4$ or so which can react with water and undergoes hydrolysis are used. Also, as for the organic electrolytic solution, for example flammable organic compound such as propylene carbonate, ethylene carbonate, diethyl carbonate or so are used. The material of the metal container, the electricity generating element, and the insulation gasket may be those which are generally used.

The electricity generating element of the lithium secondary battery refers to the element having the positive electrode plate 3 coated and dried the paste including the positive electrode active material such as lithium cobalate, lithium manganate or so to the substrate, and the negative electrode plate 1 coated and dried the paste including the negative electrode active material such as graphite or so to the substrate, and providing the separator 2 which is a non-woven fabric made of polyethylene or polypropylene or so therebetween, then it is rolled-up in a spiral form, thereby the electrons are generated by a chemical reaction.

The metal container 4 refers to the outer can made of metal for housing the electricity generating element, and usually it is a negative electrode metal container connected with the negative electrode in the electricity generating element, however it is not limited thereto. The shape may be any of button shape, coin shape, sheet shape, cylinder shape, square shape or so.

The insulation gasket 6 refers to the material which holds an insulation property in between the metal container 4 and the sealing cap 5, and also it only needs to prevent the leakage of the electrolytic solution, however it is not particularly limited; and as a material, PP, EPDM, PFA, PTFE, nylon 66 or so may be mentioned.

The sealing cap 5 refers to the metal material to cover the opened part after the electricity generating element and the electrolytic solution has been housed in the negative electrode metal can, and usually it refers to those which is connected with the positive electrode inside the electricity generating element.

The secondary battery is constituted by housing the electricity generating element and the electrolytic solution which is isolated from the outer atmosphere in the space sealed by the metal container 4, the insulation gasket 6, the sealing cap 5 and the sealing material composition 7.

Although it is not particularly limited in case the sealing material composition of the present invention is used for the sealing material of the secondary battery; however the layer of the sealing material may be formed in the following steps. The sealing material composition 7 is coated and dried using the quantified dispenser onto the surface of the insulation gasket 6, thereby the sealing material layer is formed. Separately from this, the electricity generation element formed by rolling-up the positive electrode plate 3 and the negative electrode plate 1 and the separator 2 therebetween is pressure inserted in to the metal container. The bead is formed in order to fix the sealing cap part at near the opening of this container. To the part where the insulation gasket of this bead part contacts, said sealing material composition is coated and dried using the quantified dispenser thereby the layer of the sealing material is formed. Then, the electrolytic solution is introduced, and the sealing cap plate is fitted to the opening part of the metal container via the insulation gasket formed with the sealing material layer at the surface, then it is sealed, thereby the secondary battery is produced.

EXAMPLES

Hereinafter, the present invention will be described using the examples, however the present invention is not limited thereto. Note that, in the present examples, "parts" and "%" refers to "parts by weight" and "wt %" unless mentioned otherwise.

Each characteristic is evaluated by the method described in below.

(The Method for Measuring the Coarse Particle in the Sealing Material Composition)

Based on JIS K5600-2-5, in regards with 3 mL of the sealing material composition, the average number of the coarse particle having 14 μm or larger was calculated by measuring for three times respectively using the 25 μm particle gage.

(The Production Method of the Alkaline Secondary Battery)

The electricity generation element of the alkaline secondary battery formed by rolling-up the positive electrode plate and the negative electrode plate by providing the separator therebetween was pressure inserted into the metal container of AA size. The bead part was formed at near the opening part of this container in order to fix the sealing part. On to this bead part, said sealing material composition was coated using the quantified dispenser so that the thickness of the sealing material composition layer after the drying becomes 13 micron, then carried out the drying, thereby the sealing material composition layer was formed. Then, the electrolytic solution consisting of KOH of 7N and LiOH of 1N was introduced, and the sealing cover plate which is the sealing cap was fitted to the metal container via the insulation gasket at the surface of the bead part, and then sealed, thereby the alkaline secondary battery was made. The schematic structure FIGURE of the alkaline secondary battery is shown in FIG. 1.

(The Sealing Property Test of the Alkaline Secondary Battery)

The initial electric charge was carried out after the alkaline secondary battery was engaged for 24 hours at 45° C. 20 batteries were made which were carried out with initial electric charge. Among these, 10 batteries were attached with CR test paper which changes the color to purple from yellow by alkaline, then verified whether the test paper has changed the color by the leakage of the alkaline electrolytic solution after leaving for 48 hours in the temperature and humidity testing chamber of temperature of 95° C. and humidity of 90% (the high temperature high humidity test). Further, for the rest of 10 batteries, the battery was set to a constant direction from the height of 2.5 m, and dropped for 10 times, then each battery was thoroughly washed with 50 mL water. Then, the CR test paper was immersed in the water of after wash; thereby the color change was checked to verify the leakage of the alkaline electrolytic solution (the drop test). These were made as the evaluation standards of the sealing property, and it was evaluated based on the following standard. The higher this value is, the better the sealability and the sealing property are.

A: None of them changed the color
B: The number of battery which did not change the color 7 or more and less than 10
C: The number of battery which did not change the color 5 or more and less than 7
D: The number of battery which did not change the color 3 or more and less than 5
E: The number of battery which did not change the color 1 or more and less than 3
F: All of them have changed the color Example 1

(The Polymerization of Butadiene Rubber)

5,000 g of toluene and 810 g of butadiene were added into the 10 litter autoclave with the stirrer, and stirred thoroughly, then 0.27 mol of diethylaluminum chloride and 0.6 mmol of chromium chloride/pyridine complex were added thereby the polymerization was carried out by stirring for 3 hours at 60° C. Then, 100 mL of methanol was added to stop the polymerization. After stopping the polymerization, then it was cooled down to room temperature and the polymerized solution was taken out. After the obtained polymerized solution was steam solidified, it was vacuum dried for 48 hours at 60° C. and 780 g of butadiene rubber was obtained. The weight average molecular weight of the obtained butadiene rubber was 390,000. Also, according to the result of the $^{13}$C-NMR spectrum, the 1,4-cis content of this polymer was 97%.

(The Preparation of the Sealing Material Composition)

The master batch was obtained by kneading 308 g of butadiene rubber and 77 g of carbon (product name "DIABLACK I" made by Mitsubishi Chemical Corporation) for 10 minutes using the twin roll by setting the initial temperature of the device to 160° C. The consuming energy of this master batch during the kneading was 4,980 MJ/m$^3$. The resin temperature during the kneading increased along with the status of the kneading and it was 170° C. to 180° C.

Separately from this, the solution (concentration of 5%) was prepared (herein after it may be referred as "solution") by dissolving 110 g of styrene-isoprene block polymer (product name "Quintac 3421" made by ZEON CORPORATION) as the thermoplastic elastomer to 2,090 g of xylene. Then, the above prepared master batch, the styrene-isoprene block polymer solution, 957 g of butadiene rubber and 10,980 g of xylene were added and stirred for 8 hours by a disper. To the above obtained solution, 1,2-dimethylimidazole (hereinafter, it may be referred as "1,2-DMZ" made by SHIKOKU CHEMICALS CORPORATION) as the imidazole compound was added so that it becomes 5 parts with respect to 100 parts of butadiene rubber/styrene-isoprene block polymer, and stirred for 1 hour by the disper to obtain sealing material composition (concentration of 10%) of butadiene rubber/styrene-isoprene block polymer=92/8. The average number of the coarse particle having 10 μm or larger in the obtained sealing material composition was 0. Also, in the battery using this sealing material composition, the number of the battery which did not change the color of the test paper due to the leakage of the alkaline electrolytic solution was 10 out of 10 after leaving for 48 hours in the temperature and humidity testing chamber of temperature of 95° C. and the humidity of 90%. The number of the battery which did not change the color of the CR test paper of the water after washing each battery with 50 mL water and setting to a constant direction from the height of 2.5 m was also 10 out of 10.

Example 2

The sealing material composition (concentration of 10%) was obtained as the same method as the example 1, except for changing the kneading time of the master batch to 30 minutes. The consuming energy of this master batch during the kneading was 12,310 mL/m$^3$. In regards with the obtained sealing material composition, the same evaluations were carried out as the example 1. The number of the battery which did not change the color of the CR test paper at the high temperature high humidity test was 10 out of 10, and the number of the battery which did not change the color of the CR test paper at the drop test was 9 out of 10.

Example 3

The sealing material composition (concentration of 10%) was obtained as the same method as the example 1, except for using cyclohexane instead of xylene, changing the method of kneading of the master batch to the banbury mixer form the twin roll and also changing the temperature at the kneading to 170° C. The consuming energy of this master batch during the kneading was 4,910 MJ/m$^3$. In regards with the obtained sealing material composition, the same evaluations were carried out as the example 1. The average number of the coarse particle was 0, the number of the battery which did not change the color of the CR test paper at the high temperature high humidity test was 9 out of 10, and the number of the battery which did not change the color of the CR test paper at the drop test was 8 out of 10.

Example 4

The sealing material composition (concentration of 10%) was obtained as the same method as the example 1, except for changing the method of kneading of the master batch to the isotropic twin axis kneader from twin roll and also changing the temperature at the kneading to 170° C. The consuming energy of this master batch during the kneading was 5,320 MJ/m$^3$. In regards with the obtained sealing material composition, the same evaluations were carried out as the example 1. The average number of the coarse particle was 2, the number of the battery which did not change the color of the CR test paper at the high temperature high humidity test was 10 out of 10, and the number of the battery which did not change the color of the CR test paper at the drop test was 9 out of 10.

Example 5

The sealing material composition (concentration of 10%) was obtained as the same method as the example 1, except for changing the ratio between butadiene rubber and the thermoplastic elastomer to 85/15 from 92/8, and also changing the temperature at the kneading to 150° C. The consuming energy of this master batch during the kneading was 4,230 MJ/$m^3$. In regards with the obtained sealing material composition, the same evaluations were carried out as the example 1. The average number of the coarse particle was 1, the number of the battery which did not change the color of the CR test paper at the high temperature high humidity test was 8 out of 10, and the number of the battery which did not change the color of the CR test paper at the drop test was 7 out of 10.

Example 6

The sealing material composition (concentration of 10%) was obtained as the same method as the example 5, except for changing the ratio between butadiene rubber and the thermoplastic elastomer to 75/25 from 85/15, and changing the time of kneading the master batch to 3 minutes from 10 minutes, further also changing the temperature at the kneading to 130° C. The consuming energy of this master batch during the kneading was 610 MJ/$m^3$. In regards with the obtained sealing material composition, the same evaluations were carried out as the example 1. The average of the number of the coarse particle was 8, the number of the battery which did not change the color of the CR test paper at the high temperature high humidity test was 7 out of 10, and the number of the battery which did not change the color of the CR test paper at the drop test was 6 out of 10.

Example 7

The sealing material composition (concentration of 10%) was obtained as the same method as the example 6, except for not adding the imidazole compound. The consuming energy of this master batch during the kneading was 630 MJ/$m^3$. In regards with the obtained sealing material composition, the same evaluations were carried out as the example 1s. The average number of the coarse particle was 8, the number of the battery which did not change the color of the CR test paper at the high temperature high humidity test was 5 out of 10, and the number of the battery which did not change the color of the CR test paper at the drop test was 5 out of 10.

Comparative Example 1

The sealing material composition (concentration of 10%) was obtained as the same method as the example 1, except for changing the stirring method to the disper from the twin roll, and setting the temperature to 55° C., further adding the material at once. The consuming energy of this master batch during the kneading was 490 MJ/$m^3$. In regards with the obtained sealing material composition, the same evaluations were carried out as the example. The average number of the coarse particle was 30, the number of the battery which did not change the color of the CR test paper at the high temperature high humidity test was 1 out 10, and the number of the battery which did not change the color of the CR test paper at the drop test was 0 out of 10.

Comparative Example 2

The sealing material composition (concentration of 10%) was obtained as the same method as the comparative example 1, except for changing the stirring time to 60 minutes from 10 minutes, and changing the setting temperature to 60° C. The consuming energy of this master batch during the kneading was 470 MJ/$m^3$. In regards with the obtained sealing material composition, the same evaluations were carried out as the example 1. The average of the number of the coarse particle was 15, the number of the battery which did not change the color of the CR test paper at the high temperature high humidity test was 2 out of 10, and the number of the battery which did not change the color of the CR test paper at the drop test was 2 out of 10.

(The Production Method of Lithium Secondary Battery)

The electricity generation element of the alkaline secondary battery was formed by rolling-up the positive electrode plate and the negative electrode plate by providing the separator therebetween, then pressure inserted into the metal container of AA size. The bead part was formed at near the opening part of this container in order to fix the sealing part. On to this bead part, said sealing material composition was coated using the quantified dispenser so that the thickness of the sealing material composition layer after the drying becomes 13 micron, then carried out the drying, thereby the sealing material composition layer was formed. Then, the electrolytic solution prepared so that $LiPF_6$ concentration becomes 1 mol/l by adding $LiPF_6$ into the mixed solution of ethylene carbonate/diethyl carbonate=1/2 (vol %/vol %) was introduced, and the sealing cover plate which is the sealing cap was fitted to the metal container via the insulation gasket at the surface of the bead part, then sealed, thereby the lithium secondary battery was made. The schematic structure FIGURE of the lithium secondary battery is shown in FIG. 1.

(The Sealing Property Test of the Lithium Secondary Battery)

The initial electric charge was carried out after the alkaline secondary battery was engaged for 24 hours at 45° C. 20 batteries were made which were carried out with initial electric charge. Among these, 10 batteries was left for 48 hours in the temperature and humidity testing chamber of temperature of 60° C. and humidity of 90%, and verified the leakage of the electrolytic solution in VOC (Volatile Organic Compounds) tester housed in the glass container (the high temperature high humidity test). Further, for the rest of 10 batteries, the battery was set to a constant direction from the height of 2.5 m, and dropped for 10 times, then each battery was thoroughly washed with 50 mL water. Then, the leakage of the electrolytic solution was verified by VOC tester housed in the glass container (the drop test). The higher this value is, the better the sealability and the sealing properties are.

A: None of them leaked out

B: The number of battery which did not leak out 7 or more and less than 10

C: The number of battery which did not leak out 5 or more and less than 7

D: The number of battery which did not leak out 3 or more and less than 5

E: The number of battery which did not leak out 1 or more and less than 3

F: All of them has leaked out

Example 8

The lithium secondary battery was produced by using the sealing material composition obtained in the example 1. When the high temperature high humidity test was carried out to the lithium secondary battery using this sealing material composition, the number of the battery which did not leak out the electrolytic solution was 10 out of 10, and the number of the battery which did not leak out the electrolytic solution at the drop test was 10 out of 10.

Example 9

The lithium secondary battery was produced in the same method as the example 8 except for using the sealing material composition obtained in the example 7. When the high temperature high humidity test was carried out to the lithium secondary battery using this sealing material composition, the number of the battery which did not leak out the electrolytic solution was 6 out of 10, and the number of the battery which did not leak out the electrolytic solution at the drop test was 6 out of 10.

Comparative Example 3

The lithium secondary battery was produced in the same method as the example 8 except for using the sealing material composition obtained in the comparative example 1. When the high temperature high humidity test was carried out to the lithium secondary battery using this sealing material composition, the number of the battery which did not leak out the electrolytic solution was 2 out of 10, and the number of the battery which did not leak out the electrolytic solution at the drop test was 1 out of 10.

TABLE 1

| Table 1 | unit | Example 1 | Example 2 | Example 3 | Example 4 | Example 5 | Example 6 | Example 7 | Comparative example 1 | Comparative example 2 |
|---|---|---|---|---|---|---|---|---|---|---|
| Diene rubber | — | Butadiene rubber | Butadiene rubber | Butadiene rubber | Butadiene rubber | Butadiene rubber | Butadiene rubber | Butadiene rubber | Butadiene rubber | Butadiene rubber |
| 1,4-cis content | % | 97 | 97 | 97 | 97 | 97 | 97 | 97 | 97 | 97 |
| Organic liquid substance | — | xylene | xylene | cyclohexane | xylene | xylene | xylene | xylene | xylene | xylene |
| Boiling point | ° C. | 138~144 | 138~144 | 81 | 138~144 | 138~144 | 138~144 | 138~144 | 138~144 | 138~144 |
| SP value | $MPa^{1/2}$ | 18.0~18.5 | 18.0~18.5 | 16.8 | 18.0~18.5 | 18.0~18.5 | 18.0~18.5 | 18.0~18.5 | 18.0~18.5 | 18.0~18.5 |
| Diene rubber/thermoplastics elastomer | % | 92/8 | 92/8 | 92/8 | 92/8 | 85/15 | 75/25 | 75/25 | 92/8 | 92/8 |
| Imidazole compound | — | 1,2-DMZ | 1,2-DMZ | 1,2-DMZ | 1,2-DMZ | 1,2-DMZ | 1,2-DMZ | — | 1,2-DMZ | 1,2-DMZ |
| Production method of the master batch | | | | | | | | | mixing at once (*1) | mixing at once (*2) |
| Kneading method | — | Twin roll | Twin roll | Banbury mixer | Isotropic twin axis kneader | Twin roll | Twin roll | Twin roll | — | — |
| Kneading time | min | 10 | 30 | 10 | 10 | 10 | 3 | 3 | — | — |
| Kneading temperature | ° C. | 160 | 160 | 170 | 170 | 150 | 130 | 130 | — | — |
| Consuming energy | $MJ/m^3$ | 4980 | 12310 | 4910 | 5320 | 4230 | 610 | 630 | — | — |
| Coarse particle (average) | number | 0 | 4 | 0 | 2 | 1 | 8 | 8 | 30 | 15 |
| Sealing property test | | | | | | | | | | |
| Thermostatic humidistat test | number | A(10) | A(10) | B(9) | A(10) | B(8) | B(7) | C(5) | E(1) | E(2) |
| Drop test | number | A(10) | B(9) | B(8) | B(9) | B(7) | C(6) | C(5) | F(0) | E(2) |

(*1) The master batch was not prepared, and all the components were mixed at one by the disperser. The mixing time 10 minutes, the mixing temperature 55° C., the consuming energy at the mixing 490 $MJ/m^3$.
(*2) The master batch was not prepared, and all the components were mixed at one by the disperser. The mixing time 60 minutes, the mixing temperature 60° C., the consuming energy at the mixing 470 $MJ/m^3$.

TABLE 2

| Table 2 | unit | Example 8 | Example 9 | Comparative example 3 |
|---|---|---|---|---|
| Diene rubber | — | Butadiene rubber | Butadiene rubber | Butadiene rubber |
| 1,4-cis content | % | 97 | 97 | 97 |
| Organic liquid substance | — | xylene | xylene | xylene |
| Boiling point | ° C. | 138~144 | 138~144 | 138~144 |
| SP value | $MPa^{1/2}$ | 18.0~18.5 | 18.0~18.5 | 18.0~18.5 |
| Diene rubber/thermoplastics elastomer | % | 92/8 | 75/25 | 92/8 |
| Imidazole compound | — | 1,2-DMZ | — | 1,2-DMZ |
| Production method of the master batch | | | | mixing at once (*1) |

TABLE 2-continued

| Table 2 | unit | Example 8 | Example 9 | Comparative example 3 |
|---|---|---|---|---|
| Kneading method | — | Twin roll | Twin roll | — |
| Kneading time | min | 10 | 3 | — |
| Kneading temperature | ° C. | 160 | 130 | — |
| Consuming energy | $MJ/m^3$ | 4980 | 630 | — |
| Coarse particle (average) | number | 0 | 8 | 30 |
| Sealing property test | | | | |
| Thermostatic humidistat test | number | A(10) | C(6) | E(2) |
| Drop test | number | A(10) | C(6) | E(1) |

(*1) The master batch was not prepared, and all the components were mixed at one by the disperser. The mixing time 10 minutes, the mixing temperature 55° C., the consuming energy at the mixing 490 $MJ/m^3$.

Based on the result of Table 1 and Table 2, as the examples 1 to 7 and the examples 8 and 9 shows, according to the present invention, when the number of the coarse particle having 10 μm or larger in the sealing material composition is 10 or less, a high sealability at the insulation gasket and the sealing part of the metal container can be obtained, thus the sealing property is excellent. Also, among the examples, the example 1 showed the highest sealability with the insulation gasket and the sealing property the high temperature high humidity test and the drop test were most excellent, wherein the example 1 used xylene having a boiling point of 138° C. to 144° C. and the SP value of 18.0 to 18.5 as the solvent, and butadiene rubber having a 1,4-cis content of 97% or more. On the other hand, the comparative examples 1 and 3 having the average number if the coarse particle of 30, and the comparative example 2 having that of 15 had significantly deteriorated sealability as those had too many coarse particles.

REFERENCES OF THE NUMERALS

1 . . . Negative electrode plate
2 . . . Separator
3 . . . Positive electrode plate
4 . . . Metal container
5 . . . Sealing cap
6 . . . Insulation gasket
7 . . . Sealing material composition (sealing layer)

The invention claimed is:

1. A sealing material composition for a secondary battery comprising a diene rubber, a thermoplastic elastomer, a carbon and an organic liquid, wherein a number of coarse particle having maximum diameter of 10 μm or larger included in 3 mL of said composition is 10 or less.

2. The sealing material composition for the secondary battery as set forth in claim 1 wherein said diene rubber is butadiene rubber.

3. The sealing material composition for the secondary battery as set forth in claim 2, wherein a weight ratio between said diene rubber and said thermoplastic elastomer (diene rubber/thermoplastic elastomer) is 60/40 to 99/1.

4. The sealing material composition for the secondary battery as set forth in claim 2, wherein said organic liquid is the organic liquid having a boiling point of 50 to 170° C. and a SP value of 14.0 to 20.0 $MPa^{1/2}$ at a normal pressure.

5. The sealing material composition for the secondary battery as set forth in claim 2 further comprising imidazole compound.

6. A secondary battery comprising a sealing layer comprising the sealing material composition for the secondary battery as set forth in claim 2 at a space between an insulation gasket mounted at the sealing cap covering an opening part of a metal container housing a electricity generating element and said metal container, and/or at a space between said insulation gasket and said sealing cap.

7. The sealing material composition for the secondary battery as set forth in claim 2 wherein said butadiene rubber is butadiene rubber having 1,4-cis content of 90% or more.

8. The sealing material composition for the secondary battery as set forth in claim 7, wherein a weight ratio between said diene rubber and said thermoplastic elastomer (diene rubber/thermoplastic elastomer) is 60/40 to 99/1.

9. The sealing material composition for the secondary battery as set forth in claim 7, wherein said organic liquid is the organic liquid having a boiling point of 50 to 170° C. and a SP value of 14.0 to 20.0 $MPa^{1/2}$ at a normal pressure.

10. The sealing material composition for the secondary battery as set forth in claim 7 further comprising imidazole compound.

11. The sealing material composition for the secondary battery as set forth in claim 1, wherein a weight ratio between said diene rubber and said thermoplastic elastomer (diene rubber/thermoplastic elastomer) is 60/40 to 99/1.

12. The sealing material composition for the secondary battery as set forth in claim 11, wherein said organic liquid is the organic liquid having a boiling point of 50 to 170° C. and a SP value of 14.0 to 20.0 $MPa^{1/2}$ at a normal pressure.

13. The sealing material composition for the secondary battery as set forth in claim 11 further comprising imidazole compound.

14. The sealing material composition for the secondary battery as set forth in claim 1, wherein said organic liquid is the organic liquid having a boiling point of 50 to 170° C. and a SP value of 14.0 to 20.0 $MPa^{1/2}$ at a normal pressure.

15. The sealing material composition for the secondary battery as set forth in claim 14 further comprising imidazole compound.

16. The sealing material composition for the secondary battery as set forth in claim 1 further comprising imidazole compound.

17. A method of producing a sealing material composition for a secondary battery as set forth in claim 1 including steps of;

obtaining a master batch by kneading a carbon, and a diene rubber and/or a thermoplastic elastomer, and dissolving or dispersing said master batch to an organic liquid solution including the diene rubber and/or the thermoplastic elastomer, together with a remaining amount of the diene rubber and/or the thermoplastic elastomer depending on the needs.

18. The method of producing the sealing material for the secondary battery as set forth in claim 17 wherein a temperature during the kneading in said step of obtaining said master batch is 100° C. to 200° C.

19. The method of producing the sealing material for the secondary battery as set forth in claim 17 wherein a consuming energy during the kneading in said step of obtaining said master batch is 500 to 30,000 $MJ/m^3$.

20. A secondary battery comprising a sealing layer comprising the sealing material composition for the secondary battery as set forth in claim 1 at a space between an insulation gasket mounted at the sealing cap covering an opening part of a metal container housing a electricity generating element and said metal container, and/or at a space between said insulation gasket and said sealing cap.

* * * * *